United States Patent
Miyake et al.

(10) Patent No.: US 6,403,749 B1
(45) Date of Patent: Jun. 11, 2002

(54) PREPARATION OF ORGANOXY-TERMINATED ORGANOPOLYSILOXANES

(75) Inventors: Masatoshi Miyake, Gunma-ken; Chinami Matsui; Kenichi Kimura, both of Annaka; Hironao Fujiki, Gunma-ken, all of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/714,142

(22) Filed: Nov. 17, 2000

(30) Foreign Application Priority Data

Nov. 17, 1999 (JP) .................................. 11-327415

(51) Int. Cl.⁷ ............................................. C08G 77/06
(52) U.S. Cl. .............................. 528/20; 528/18; 528/34
(58) Field of Search ............................ 528/34, 17, 20, 528/18

(56) References Cited

U.S. PATENT DOCUMENTS

| | | |
|---|---|---|
| 3,151,099 A | 9/1964 | Ceyzeriat et al. |
| 3,294,739 A * | 12/1966 | Weyenberg |
| 3,504,051 A | 3/1970 | McVannel et al. |
| 3,542,901 A | 11/1970 | Cooper et al. |
| 3,647,846 A | 3/1972 | Hartlein et al. |
| 4,111,890 A | 9/1978 | Getson et al. |
| 4,489,191 A | 12/1984 | Chung |
| 4,528,081 A * | 7/1985 | Lien et al. |
| 4,762,879 A | 8/1988 | Letoffe et al. |
| 4,769,409 A | 9/1988 | Gay et al. |
| 4,797,445 A * | 1/1989 | Piskoto |
| 4,824,924 A | 4/1989 | Letoffe et al. |
| 5,079,324 A | 1/1992 | Cocco et al. |
| 5,352,751 A * | 10/1994 | Cocco |
| 5,663,269 A * | 9/1997 | Chu et al. |

FOREIGN PATENT DOCUMENTS

| | | |
|---|---|---|
| EP | 0210402 | 2/1987 |
| FR | 1495011 | 12/1967 |
| GB | 2133758 | 8/1984 |
| GB | 2196014 | 4/1988 |
| JP | 645698 | 6/1994 |

OTHER PUBLICATIONS

Chemical Abstracts Service No. 123:86390, XP002160835 of SU 1807143, 1 page.

* cited by examiner

*Primary Examiner*—Robert Dawson
*Assistant Examiner*—Marc S. Zimmer
(74) *Attorney, Agent, or Firm*—Birch, Stewart, Kolasch & Birch, LLP

(57) ABSTRACT

An organoxy-terminated organopolysiloxane of the general formula (A):

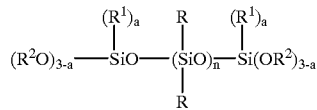

wherein R is a monovalent hydrocarbon group, $R^1$ is a monovalent hydrocarbon group of 1–18 carbon atoms, and $R^2$ is an organic group of 1–18 carbon atoms, and "a" is an integer of 0, 1 or 2, is prepared by reacting an organopolysiloxane of the formula: $HO(R_2SiO)_nH$ having a viscosity of 10–100,000 centistokes at 25° C. with an organoxysilane of the formula: $(R^2O)_{4-a}$—Si—$(R^1)_a$ or a partial hydrolyzate thereof in the presence of a tetraalkoxytitanium.

4 Claims, No Drawings

PREPARATION OF ORGANOXY-TERMINATED ORGANOPOLYSILOXANES

This invention relates to a method for preparing an organoxy-terminated organopolysiloxane useful as a base polymer in a one-part organopolysiloxane elastomer composition which is stable during storage in the absence of moisture and crosslinks with air-borne moisture at the ambient temperature.

BACKGROUND OF THE INVENTION

It is well known in the art to prepare organoxy-terminated organopolysiloxanes by reacting di-, tri- or tetraalkoxysilanes with hydrosilyl groups attached to silicon atoms at molecular ends in the presence of catalysts.

The use of amine catalysts is disclosed in U.S. Pat. No. 3,542,901, U.S. Pat. No. 4,489,191, French Patent No. 2,597,876, and French Patent No. 2,597,877. U.S. Pat. No. 3,504,051 discloses the use of potassium acetate, French Patent No. 1,495,011 discloses the use of inorganic oxides, U.S. Pat. No. 3,647,846 discloses the combination of titanates and amines, French Patent No. 2,604,713 discloses the combination of carboxylic acids and amines, EP 0210402 discloses the use of carbamates, French Patent No. 2,597,875 discloses the use of oxime functional group-containing organic compounds, and JP-B 6-45698 discloses the use of lithium hydroxide.

However, the use of amine catalysts has many problems including a reaction time as long as about 15 to 30 minutes at a heating temperature of 60° C., a low percent end blockage, an increased amount of residual SiOH, yellowing and storage instability due to the residual amine which is difficult to remove.

The foregoing methods use acids or bases and need a neutralizing step. Although the products are now required to be neutral; the use of amine catalysts suffers from a high probability of leaving amines in the products.

Additionally, U.S. Pat. No. 4,111,890 describes the use of organic titanium derivatives, and British Patent No. 2,133,758 describes the use of alkoxyaluminum chelates. The aluminum and titanium chelates used therein are adequate as the condensation curing catalyst, but not for end blockage because they promote crosslinking during reaction, resulting in gelation and substantial thickening.

Therefore, an object of the invention is to provide a method for preparing an organoxy-terminated organopolysiloxane in an efficient manner without gelation or other troubles and without a need for neutralization.

SUMMARY OF THE INVENTION

The invention provides a method for preparing an organoxy-terminated organopolysiloxane, comprising the step of reacting (1) an organopolysiloxane of the following general formula (I):

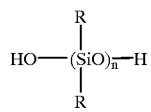

wherein R is a monovalent hydrocarbon group and n is such an integer that the organopolysiloxane has a viscosity of 10 to 100,000 centistokes at 25° C., with (2) an organoxysilane of the following general formula (II):

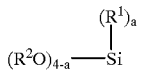

wherein "a" is an integer of 0, 1 or 2, $R^1$ is a substituted or unsubstituted monovalent hydrocarbon group of 1 to 18 carbon atoms, and $R^2$ is an organic group of 1 to 18 carbon atoms, or a partial hydrolyzate thereof, to form an organoxy-terminated organopolysiloxane of the general formula (A):

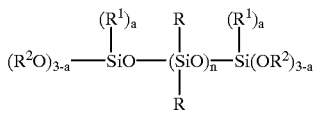

wherein R, $R^1$, $R^2$, "a" and n are as defined above. The invention is characterized in that the reaction of components (1) and (2) is effected in the presence of (3) a tetraalkoxytitanium of the following general formula (III):

$$Ti(OR^3)_4 \qquad (III)$$

wherein $R^3$ is an alkyl group as a catalyst. The organoxy-terminated organopolysiloxane of formula (A) is prepared within one hour even at room temperature and usually, at an end blockage of at least 85%. By adding methanol to a mixture of components (1), (2) and (3) during reaction or at the end of reaction, the end blocking time is significantly reduced.

The method is advantageous in that since neither basic nor acidic catalysts are used, the resulting organoxy-terminated organopolysiloxane is suited in electric and electronic applications. In the presence of moisture, this organopolysiloxane will readily cure into a rubbery elastomer. A room temperature curable composition comprising this organopolysiloxane as a base polymer is useful in a wide variety of applications such as adhesives, coating agents, electrically insulating sealants, and building sealants.

DESCRIPTION OF THE PREFERRED EMBODIMENT

The method for preparing an organoxy-terminated organopolysiloxane according to the invention starts with (1) an organopolysiloxane and (2) an organoxysilane. Component (1) is an organopolysiloxane of the following general formula (I).

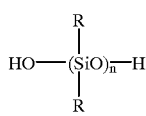

Herein R is a monovalent hydrocarbon group and n is such an integer that the organopolysiloxane has a viscosity of 10 to 100,000 centistokes at 25° C.

R is selected from substituted or unsubstituted monovalent hydrocarbon groups preferably of 1 to 10 carbon atoms, and more preferably 1 to 8 carbon atoms, for example, alkyl groups such as methyl, ethyl, propyl, butyl and hexyl, aryl groups such as phenyl and tolyl, alkenyl groups such as vinyl, allyl and butenyl, aralkyl groups such as benzyl and 2-phenylethyl, and substituted ones of the foregoing groups in which some or all of the hydrogen atoms attached to carbon atoms are replaced by halogen atoms and cyano groups, such as chloromethyl, trifluoropropyl and cyanoethyl. Of these, methyl, phenyl, vinyl and trifluoropropyl are preferred, with methyl being most preferred.

The letter n representative of the degree of polymerization is such an integer that the organopolysiloxane has a viscosity of 10 to 100,000 centistokes at 25° C. and preferably 500 to 100,000 centistokes at 25° C. for ease of working.

Illustrative, non-limiting examples of the organopolysiloxane of formula (I) are given below.

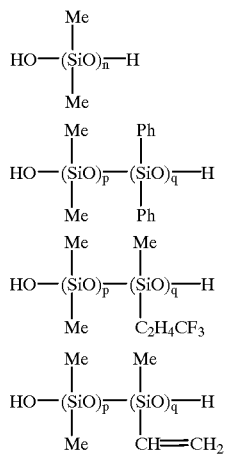

(I-a)

In the formulas, Me is methyl, Ph is phenyl, p and q are positive integers, p+q is an integer corresponding to n. Of these, the compounds of formula (I-a) are preferred.

In addition to the above-described structure, the polymer may include a structure which is blocked at one end with 0 to 10 mol % of trimethylsilyl groups. Also the polymer may contain 0 to 3 mol % based on its molecular weight of a branched structure as shown by the following structural formula.

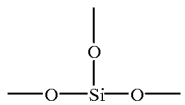

The other starting reactant, component (2) serves as an end blocking agent for component (1) and is an organoxysilane of the following general formula (II) or a partial hydrolyzate thereof.

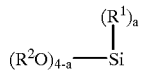

Herein "a" is an integer of 0, 1 or 2, and preferably 0 or 1, $R^1$ is a substituted or unsubstituted monovalent hydrocarbon group of 1 to 18 carbon atoms, and $R^2$ is an organic group of 1 to 18 carbon atoms.

Examples of $R^1$ are alkyl, alkenyl, aryl and aralkyl groups and halo- and cyano-substituted groups thereof as exemplified above for R, with alkyl, alkenyl and aryl groups being preferred.

$R^2$ is preferably selected from aliphatic organic groups of 1 to 18 carbon atoms, for example, alkyl, alkenyl, aryl, alkyl ether, alkyl ester, alkyl ketone and alkylcyano groups. R2 is preferably an alkyl group, more preferably alkyl group of 1 to 4 carbon atoms, and most preferably methyl.

The preferred organoxysilane is an alkoxysilane of the following general formula (II-a):

$$R^1{}_b Si(OCH_3)_{4-b} \quad \text{(II-a)}$$

wherein $R^1$ is as defined above and b is equal to 0 or 1, or a partial hydrolyzate thereof.

Illustrative, non-limiting examples of the organoxysilane include n-propyltrimethoxysilane, methyltrimethoxysilane, vinyltrimethoxysilane, tetramethoxysilane, ethyltrimethoxysilane, and phenyltrimethoxysilane. For ease of handling, vinyltrimethoxysilane and n-propyltrimethoxysilane are especially preferred. In the batchwise preparation where reaction heat accumulates, n-propyltrimethoxysilane is especially preferred because of its low volatility.

Preferably components (1) and (2) are used in such amounts that the moles of component (2) is at least equal to the moles of component (1) or silanol. More preferably the ratio of the moles of component (1) to the moles of component (2) is from 1:1 to 1:100 and especially from 1:1 to 1:20. Using component (2) in excess is effective for reducing the time for ends to be blocked and yielding a high percent end blockage. A molar ratio within the above range permits a continuous process to be employed with better results.

By reacting components (1) and (2), there is prepared an organoxy-terminated organopolysiloxane of the general formula (A):

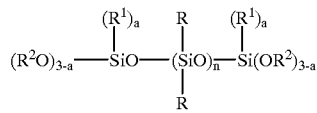

wherein R, $R^1$, $R^2$, "a" and n are as defined above.

According to the invention, the reaction of components (1) and (2) is effected in the presence of (3) a tetraalkoxytitanium or titanium tetraalkoxide catalyst of the following general formula (III):

$$Ti(OR^3)_4 \quad \text{(III)}$$

wherein $R^3$ is an alkyl group, preferably of 1 to 19 carbon atoms, and especially 2 to 4 carbon atoms.

Any titanium tetraalkoxide may be used only for end blocking purposes. The end blocking rate is faster in the order of titanium tetraethoxide>titanium tetra-n-propoxide>titanium tetraisopropoxide>titanium tetrabutoxide. Of these, titanium tetraethoxide is most preferred although titanium tetraisopropoxide is most readily available in the industry.

Component (3) is preferably used in such amounts that the ratio of the moles of component (3) to the moles of silanol (1) is from 0.001 to 20, more preferably from 0.01 to 10, and especially 0.05 to 5. Outside the range, the catalyst may become ineffective.

According to the invention, components (1) to (3) are admitted into a suitable reactor whereupon reaction proceeds at room temperature or elevated temperature. Preferably the reaction is effected under pressure. In this regard, a reactor capable of tight closure so that pressure is naturally applied is preferred because the reaction is promoted thereby. Although a higher pressure is preferable, an upper limit of up to 10 atm. and especially up to 5 atm. is recommended for safety. The lower limit is not critical as long as the pressure is higher than atmospheric, although it is at least 1.05 atm. and especially at least 1.1 atm.

According to the invention, reaction is effected by mixing components (1) to (3) under atmospheric pressure or under applied pressure. More specifically, component (1) first reacts with component (3) and thus thickens. Then component (2) substitutes for component (3) whereupon the desired organoxy-terminated organopolysiloxane is obtained. Although the viscosity is once increased, the product resumes the original or desired viscosity at this point.

In the preferred embodiment, methanol is added to the reaction system after it has thickened by reaction of component (1) with component (3). By adding methanol, the time for end blockage with organoxy groups can be significantly reduced. If methanol is added at the initial, there is a potential for methanol to stop the end blocking reaction. It is therefore preferred to add methanol after component (1) has reacted with component (3) to incur a viscosity increase and before the end blocking reaction with component (3) proceeds to completion. Even when methanol is added at the substantial end of reaction, the percent end blockage can be further increased.

An appropriate amount of methanol added is about 0.1 to 20 parts, and especially about 0.2 to 10 parts by weight per 100 parts by weight of component (1). Less amounts of methanol are ineffective whereas excessive amounts may rather restrain the end blocking reaction. Since there is a situation where the viscosity changes a little even after the completion of reaction, mixing for deaeration under vacuum or atmospheric pressure is recommended.

The organopolysiloxane of formula (A) is useful as a base polymer in a room temperature curable organopolysiloxane composition of the one part type. To the organopolysiloxane, there may be added a filler, for example, surface treated or untreated silica, heavy calcium carbonate, surface treated or untreated colloidal calcium carbonate; a curing agent, for example, a compound having at least two hydrolyzable groups; an adhesive aid as typified by aminosilane; a condensation catalyst, and other additives. By adding these additives during the mixing step for deaeration, there is obtained a room temperature curable organopolysiloxane composition of the one part type. The room temperature curable organopolysiloxane composition comprising the organoxy-terminated organopolysiloxane according to the invention remains stable during storage, is strongly adhesive to adherends, especially surface treated aluminum members, and cures into a product maintaining a firm bond against water immersion and heating. The room temperature curable composition is thus useful in a wide variety of applications such as adhesives, coating agents, electrically insulating sealants, and building sealants.

EXAMPLE

Examples of the invention are given below by way of illustration and not by way of limitation. All parts are by weight.

The base oils obtained in Examples were analyzed by $^{29}$Si-NMR, from which a percent end blockage was determined. The results are shown in Tables 1 and 2.

Example 1

In a Shinagawa mixer, 100 parts of α,ω-dihydroxydimethylpolysiloxane having a viscosity of 50,000 cSt at 25° C., 7 parts of n-propyltrimethoxysilane, and 0.1 part of titanium tetraethoxide were mixed for 30 minutes at room temperature. The mixture was further mixed in vacuum for 30 minutes for deaeration purposes, yielding a base oil which was measured for end blockage by $^{29}$Si-NMR.

Example 2

A base oil was prepared as in Example 1 except that 0.1 part of titanium tetra-n-propoxide was used instead of 0.1 part of titanium tetraethoxide.

Example 3

A base oil was prepared as in Example 1 except that 0.1 part of titanium tetraisopropoxide was used instead of 0.1 part of titanium tetraethoxide.

Example 4

A base oil was prepared as in Example 1 except that 0.1 part of titanium tetra-n-butoxide was used instead of 0.1 part of titanium tetraethoxide.

Example 5

A base oil was prepared as in Example 1 except that 0.1 part of titanium tetra-2-ethylhexyloxide was used instead of 0.1 part of titanium tetraethoxide.

Example 6

A base oil was prepared as in Example 1 except that the amount of titanium tetraethoxide was changed to 0.25 part, and 2 parts of methanol was added after the mixture thickened.

Example 7

A base oil was prepared as in Example 6 except that the amount of methanol was changed to 5 parts.

Example 8

A base oil was prepared as in Example 1 except that 6.5 parts of vinyltrimethoxysilane was used instead of 7 parts of n-propyltrimethoxysilane.

Example 9

A base oil was prepared as in Example 1 except that 6 parts of methyltrimethoxysilane was used instead of 7 parts of n-propyltrimethoxysilane.

Example 10

A base oil was prepared as in Example 1 except that the amount of n-propyltrimethoxysilane was changed to 3.5 parts.

Example 11

A base oil was prepared as in Example 1 except that the amount of n-propyltrimethoxysilane was changed to 10.5 parts.

Example 12

A base oil was prepared as in Example 1 except that the amount of titanium tetraethoxide was changed to 1 part.

Example 13

A base oil was prepared as in Example 1 except that 10 parts of γ-(methacryloxypropyl)trimethoxysilane was used instead of 7 parts of n-propyltrimethoxysilane.

Example 14

A base oil was prepared as in Example 1 except that 7 parts of vinyltri(3-methoxypropyleneglycoxy)silane was used instead of 7 parts of n-propyltrimethoxysilane.

Example 15

A base oil was prepared as in Example 1 except that 10 parts of γ-(methacryloxypropyl)methyldimethoxysilane was used instead of 7 parts of n-propyltrimethoxysilane.

Example 16

In a Shinagawa mixer, 100 parts of α,ω-dihydroxydimethylpolysiloxane having a viscosity of 50,000 cSt at 25° C., 7 parts of n-propyltrimethoxysilane, and 5 parts of methanol were mixed for 5 minutes at room temperature, and 0.2 part of titanium tetraethoxide was added. The mixture was mixed for 30 minutes at room temperature, then mixed in vacuum for 30 minutes for deaeration purposes, yielding a base oil.

Example 17

In a Shinagawa mixer, 100 parts of α,ω-dihydroxydimethylpolysiloxane having a viscosity of 50,000 cSt at 25° C., 7 parts of n-propyltrimethoxysilane, and 0.1 part of titanium tetraethoxide were mixed for 10 minutes at room temperature and a pressure of 2 atm. The mixture was then mixed for 30 minutes for deaeration purposes, yielding a base oil.

Example 18

In a Shinagawa mixer, 100 parts of α,ω-dihydroxydimethylpolysiloxane having a viscosity of 20,000 cSt at 25° C., 5 parts of methyltrimethoxysilane, and 0.1 part of titanium tetraethoxide were mixed for 3 minutes at room temperature and a pressure of 5 atm. The mixture was then mixed under atmospheric pressure for 20 minutes for deaeration purposes, yielding a base oil.

Example 19

In a Shinagawa mixer, 100 parts of α,ω-dihydroxydimethylpolysiloxane having a viscosity of 5,000 cSt at 25° C., 6 parts of vinyltrimethoxysilane, and 0.2 part of titanium tetraethoxide were mixed for 5 minutes at 40° C. and a pressure of 2 atm., and 2 parts of methanol was added. The mixture was then mixed under atmospheric pressure for 20 minutes for deaeration purposes, and mixed at 60° C. for 30 minutes for deaeration purposes, yielding a base oil.

Comparative Example 1

In a Shinagawa mixer, 100 parts of α,ω-dihydroxydimethylpolysiloxane having a viscosity of 50,000 cSt at 25° C., 6.5 parts of vinyltrimethoxysilane, and 0.2 part of lithium hydroxide were mixed for one hour at room temperature, and 3 parts of ethylene chlorohydrin was added for neutralization. The mixture was then mixed under vacuum at 100° C. for deaeration purposes, yielding a base oil which was measured for end blockage by $^{29}$Si-NMR.

Comparative Example 2

A base oil was prepared as in Comparative Example 1 except that 0.5 part of a 10% methanol solution of lithium hydroxide was added.

Comparative Example 3

A base oil was prepared as in Comparative Example 1 except that 0.2 part of aluminum isopropoxide di(ethylacetoacetonato) was added instead of the 10% methanol solution of lithium hydroxide. Gelation occurred.

Comparative Example 4

A base oil was prepared as in Comparative Example 1 except that 0.2 part of titanium diisopropoxide di(ethylacetoacetonato) was added instead of the 10% methanol solution of lithium hydroxide. Gelation occurred.

Comparative Example 5

A base oil was prepared as in Comparative Example 1 except that 0.2 part of dibutyltin dilaurate was added instead of the 10% methanol solution of lithium hydroxide. Gelation occurred.

Comparative Example 6

A base oil was prepared as in Comparative Example 1 except that 0.2 part of tin dilaurate was added instead of the 10% methanol solution of lithium hydroxide. Gelation occurred.

Comparative Example 7

A base oil was prepared as in Comparative Example 1 except that the 10% methanol solution of lithium hydroxide was omitted and no catalyst was added.

TABLE 1

|  | End blockage (%) | Reaction time (min) | Terminal monomethoxide content (%) |
|---|---|---|---|
| Example 1 | 94.5 | 30 | 0.52 |
| Example 2 | 93.8 | 30 | 0.58 |
| Example 3 | 93.3 | 30 | 0.60 |
| Example 4 | 92.4 | 30 | 0.80 |
| Example 5 | 90.8 | 30 | 0.88 |
| Example 6 | 95.7 | 30 | 0.12 |
| Example 7 | 92.8 | 30 | 0.12 |
| Example 8 | 93.0 | 30 | 0.59 |
| Example 9 | 92.7 | 30 | 0.52 |
| Example 10 | 91.1 | 30 | 0.57 |
| Example 11 | 98.2 | 30 | 0.57 |
| Example 12 | 89.9 | 30 | 1.02 |
| Example 13 | 93.4 | 30 | 0.62 |
| Example 14 | 97.8 | 30 | 0.34 |
| Example 15 | 88.8 | 30 | 0.45 |
| Example 16 | 97.1 | 30 | 0.21 |
| Example 17 | 98.4 | 10 | 0.38 |
| Example 18 | 99.0 | 3 | 0.15 |
| Example 19 | 97.5 | 5 | 0.20 |

TABLE 2

|  | End blockage (%) | Reaction time (min) | Terminal monomethoxide content (%) |
|---|---|---|---|
| CE 1 | 56.7 | 60 | 7.45 |
| CE 2 | 60.3 | 60 | 9.25 |
| CE 3 | unmeasurable because of gelation upon admission | | |
| CE 4 | unmeasurable because of gelation upon admission | | |
| CE 5 | unmeasurable because of gelation upon admission | | |
| CE 6 | unmeasurable because of gelation upon admission | | |
| CE 7 | 0 | 60 | 0 |

According to the invention, organoxy-terminated organopolysiloxanes are prepared within about one hour while keeping an approximately constant end blockage of about 85 to 99%.

Japanese Patent Application No. 11-327415 is incorporated herein by reference.

Reasonable modifications and variations are possible from the foregoing disclosure without departing from either the spirit or scope of the present invention as defined by the claims.

What is claimed is:

1. A method for preparing an organoxy-terminated organopolysiloxane, comprising the steps of:

reacting (1) an organopolysiloxane of the following general formula (I):

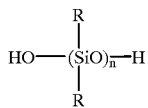

wherein R is a monovalent hydrocarbon group and n is such an integer that the organopolysiloxane has a viscosity of 10 to 100,000 centistokes at 25° C., with (2) an organopolysiloxane of the following general formula (II):

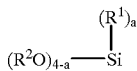

wherein "a" is an integer of 0, 1 or 2, $R^1$ is a substituted or unsubstituted monovalent hydrocarbon group of 1 to 18 carbon atoms, and R2 is an organic group of 1 to 18 carbon atoms, or a partial hydrolyzate thereof, to form an organoxy-terminated organopolysiloxane of the general formula (A):

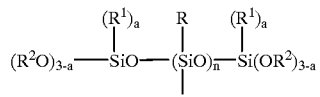

wherein R, $R^1$, $R^2$, "a" and n are as defined above, the reaction of components (1) and (2) being effected in the presence of (3) a tetraalkoxytitanium of the following general formula (III):

$$Ti(OR^3)_4 \qquad (III)$$

wherein $R^3$ is an alkyl group, and adding methanol during or at the end of the reaction.

2. The method of claim 1, wherein the reaction is effected at a pressure of 1.05 atm to 10 atm.

3. The method of claim 1 wherein component (2) is an alkoxysilane of the following general formula (II-a):

$$R^1{}_b Si(OCH_3)_{4-b} \qquad (II\text{-}a)$$

wherein $R^1$ is as defined above and b is equal to 0 or 1, or a partial hydrolyzate thereof.

4. The method of claim 1 wherein component (3) is tetraethoxytitanium.

* * * * *